US010735200B2

United States Patent
Davoust et al.

(10) Patent No.: US 10,735,200 B2
(45) Date of Patent: Aug. 4, 2020

(54) METHODS AND SYSTEMS FOR KEY GENERATION

(71) Applicant: Comcast Cable Communications, LLC, Philadelphia, PA (US)

(72) Inventors: Nancy Louise Davoust, Louisville, CO (US); Kevin Norman Taylor, Parker, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 107 days.

(21) Appl. No.: 14/671,137

(22) Filed: Mar. 27, 2015

(65) Prior Publication Data
US 2016/0285636 A1   Sep. 29, 2016

(51) Int. Cl.
*H04L 29/06* (2006.01)
*H04L 9/32* (2006.01)
*H04L 9/08* (2006.01)

(52) U.S. Cl.
CPC .......... *H04L 9/3242* (2013.01); *H04L 9/0816* (2013.01); *H04L 9/0819* (2013.01); *H04L 9/0836* (2013.01); *H04L 9/0866* (2013.01); *H04L 2209/24* (2013.01)

(58) Field of Classification Search
CPC ... H04L 9/3242; H04L 9/0816; H04L 9/0819; H04L 9/0836; H04L 9/0866; H04L 2209/24
See application file for complete search history.

(56) References Cited

U.S. PATENT DOCUMENTS

| 7,568,111 | B2 * | 7/2009 | Alve | H04N 7/163 380/200 |
| 8,423,789 | B1 * | 4/2013 | Poo | G06F 21/602 380/44 |
| 9,059,980 | B2 * | 6/2015 | Kean | H04L 9/3234 |
| 9,911,018 | B1 * | 3/2018 | Heinrich | G06K 19/07318 |
| 2005/0286351 | A1 | 12/2005 | Hars | |
| 2007/0282713 | A1 * | 12/2007 | Ullman | G06Q 10/087 705/26.1 |

(Continued)

OTHER PUBLICATIONS

Wangsheng, et al., "A key management scheme for wireless sensor networks based on vector group," Computer Science & Education, 2009, pp. 321-326.

(Continued)

*Primary Examiner* — John B King
(74) *Attorney, Agent, or Firm* — Ballard Spahr LLP

(57) ABSTRACT

Methods and systems for key generation and device management are disclosed. A root key can be stored on a component which can be integrated with a device, and the component can store a product class identifier. The product class identifier can define a class of products, devices, features, hardware components, or other entities. One or more keys can be generated and stored on the devices based on the product class identifier and the root key. A network operator or service provider can then provide services to a class of devices that includes the device, or perform and manage other functions. The services can be authorized or otherwise implemented based on the one or more new keys stored at the devices within the class of devices.

26 Claims, 9 Drawing Sheets

(56) References Cited

U.S. PATENT DOCUMENTS

| | | | | |
|---|---|---|---|---|
| 2009/0099967 A1* | 4/2009 | Yokota | G06Q 50/22 | 705/55 |
| 2010/0034386 A1* | 2/2010 | Choong | H04L 9/0894 | 380/270 |
| 2011/0252234 A1* | 10/2011 | De Atley | H04L 9/0891 | 713/165 |
| 2011/0252243 A1* | 10/2011 | Brouwer | H04L 9/0838 | 713/189 |
| 2012/0300938 A1* | 11/2012 | Kean | H04L 9/3234 | 380/279 |
| 2014/0129613 A1* | 5/2014 | Van Depoel | H04L 67/125 | 709/202 |
| 2014/0233736 A1* | 8/2014 | Zhang | H04L 63/062 | 380/270 |
| 2014/0237553 A1* | 8/2014 | Feuer | H04L 63/10 | 726/4 |
| 2014/0247938 A1 | 9/2014 | Desmicht et al. | | |
| 2014/0281502 A1* | 9/2014 | Keung Chan | H04L 9/3265 | 713/157 |
| 2015/0058637 A1* | 2/2015 | Raskin | G06F 21/602 | 713/189 |
| 2015/0326390 A1* | 11/2015 | Kim | H04L 9/0822 | 380/44 |
| 2016/0013939 A1* | 1/2016 | Jun | H04L 9/0866 | 380/44 |
| 2016/0132699 A1* | 5/2016 | Miller | G06F 21/80 | 713/193 |
| 2017/0373855 A1* | 12/2017 | Pritchard | H04L 67/12 | |

OTHER PUBLICATIONS

European Search Report dated Sep. 6, 2016, for application EP 16162621.3, filed on Mar. 29, 2016 and published as EP 3073669 on Sep. 28, 2016 (Applicant—Comcast Cable Communications, LLC // Inventor—Davoust, et al.) (8 pages).

\* cited by examiner

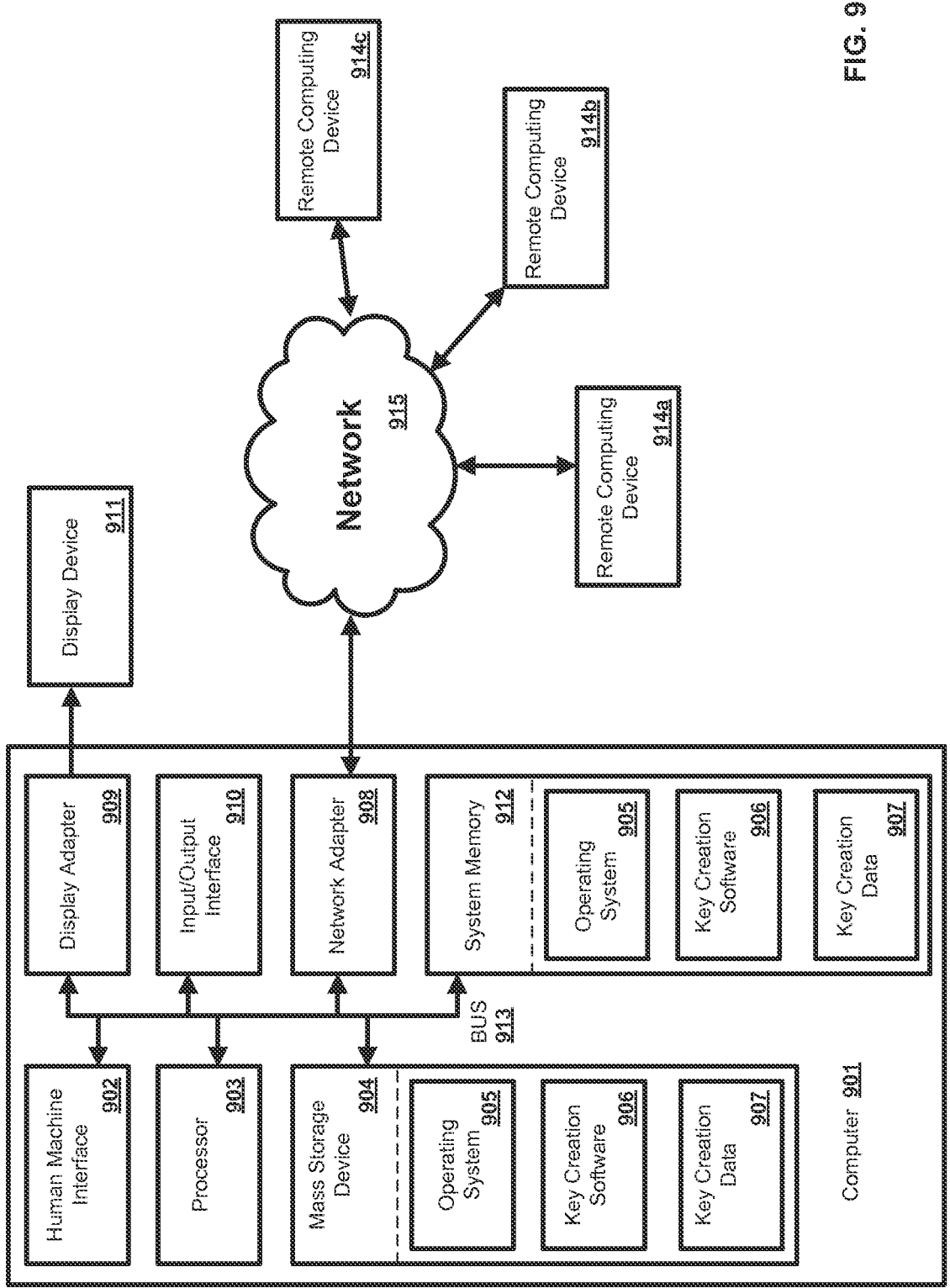

METHODS AND SYSTEMS FOR KEY GENERATION

BACKGROUND

Computing devices are increasingly targets of a wide variety of security threats. Consequently, many device architectures have integrated security. Such measures typically rely on device specific identifiers, but tracking these identifiers for every device in an ecosystem is inefficient, particularly for activities that involve a large number of devices. These and other shortcomings are addressed in the present disclosure.

SUMMARY

It is to be understood that both the following general description and the following detailed description are exemplary and explanatory only and are not restrictive, as claimed. Methods and systems for key generation and management are disclosed. In one aspect, one or more keys (e.g., encryption keys) can be created based on a product class identifier. The product class identifier can be associated with a device, a product, a class of product, a product model, a manufacturer, a service offered by the device, a product, series, product line, sales location, and/or the like. The one or more keys can be generated by binding the product class identifier with a root key. The root key can be placed on a component of a device by an entity such as a component manufacturer, service provider, network operator, etc. When the component is integrated with a device, the entity can inject the product class identifier into the component (e.g., in secure storage) or other location in the device. A cryptographic function can then be applied, or an entity can otherwise bind the root key to the product class identifier, thereby creating a new key. The new key (e.g., an encrypted key based on the root key and product class identifier) can be used to manage the device. For example, updates, services, content, and/or the like can be transmitted to the device and managed based on the new key.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 9 is a block diagram illustrating an example computing device in which the present methods and systems can operate.

DETAILED DESCRIPTION

Figure 1:
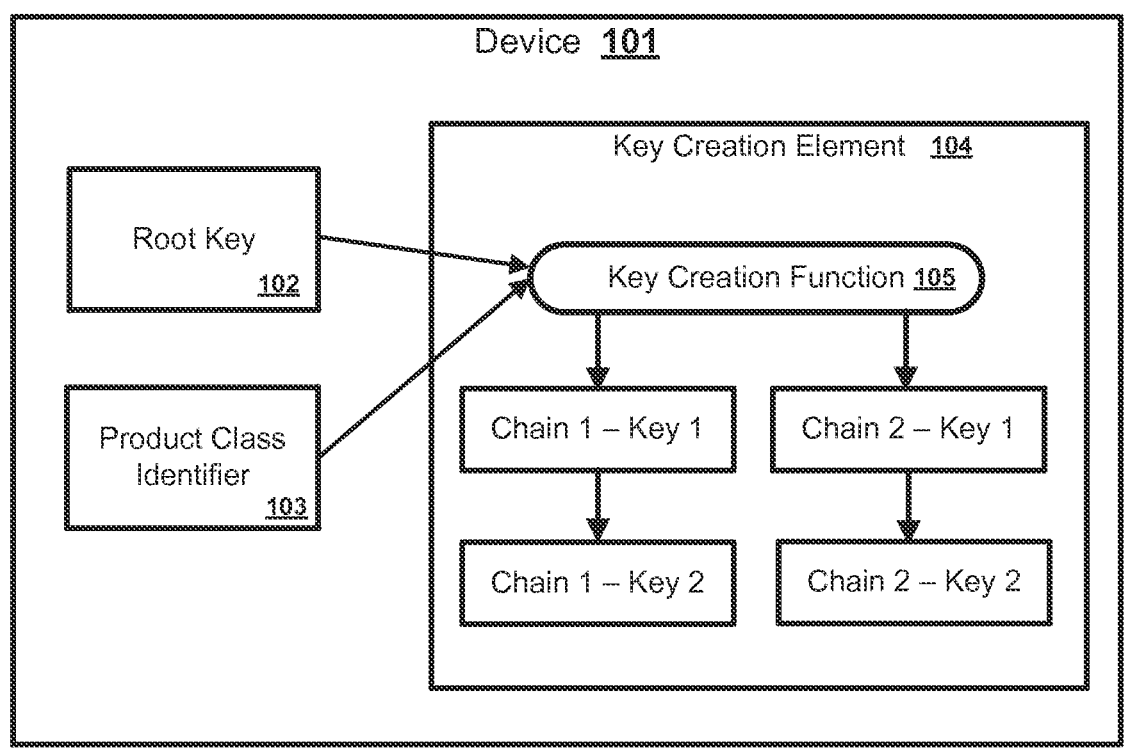
FIG. 1 is a block diagram of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded to a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded to a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for securely managing devices. Secure identities and keys can be created on a per device basis. The secure identities and keys can be used with a traditional public key infrastructure (PKI) or keying systems via digital certificates. Traditional PKI and keying systems do not, however, function well in the context where device specific identifiers and/or keys are used to secure a set of services for a class of devices, products, and/or the like. In an aspect, methods and systems are disclosed for generating secure identities and/or keys to enable management of services based on a hardware characteristic and/or product class identity. In order to differentiate services by key usage, a unique key set can be created per product class identifier (e.g., product model). The methods and systems provided herein can utilize a product class identifier to cascade (e.g., add a precise sequence of additional layers of encryption or encrypted data) into creating different keys for different product classes.

Such methods and systems can be realized as a specific hardware method, but can also be used in software implementations where key derivation functions are available and can be essentially treated as a one-time programmed value on a unique basis to bind a secure identity to a product or product family. The methods and systems provided herein allow a provider (e.g., a manufacturer or service provider) and the consumer to transparently use product classification for securing data and content without the additional overhead of tracking individual keys or certificates for each product. For example, instead of tracking a unique key for every device and/or feature, keys can be tracked for classes of devices and/or features, and services can be managed based on classes of devices and/or features. Additionally, the present methods and systems allows a service provider to manage multiple dimensions of authorization (e.g., authorization for a product family to function in general on a network and authorization of the individual device for services) using a single root key. For example, multiple keys can be created on a device based on a single root key cryptographically tied with different product class identifiers.

In an aspect, one or more product class identifiers can be loaded (e.g., transmitted, stored, injected) into a device at the time of device manufacture. The device can comprise a hardware and/or component, which has one or more root keys. For example, the one or more root keys can be loaded into the component by a manufacturer or operator of the component. Example components can comprise a system-on-chip (SoC), an application specific integrated circuit (ASIC), an integrated circuit, a field programmable gate array (FPGA), a combination thereof, and/or the like. Once the one or more product class identifiers are loaded on the device, a process can be executed on the component that causes a new derivative key to be created from both the root key and the one or more product class identifiers. In an aspect, the new derivative key can be stored (e.g., permanently) on the component and/or elsewhere on the device.

For example, a component (e.g. SoC) for use in a Cable TV set-top box can be loaded with keys at the component manufacture time (e.g., prior to the component manufacturer knowing which product the component will be integrated into). Subsequently, the component can be shipped to a device manufacturing facility where the component can be placed into a device. Then, a device manufacturer can generate, assign, associate, and/or the like a product class identifier for the device. The product class identifier can be loaded into the component and a new key created based on the product class identifier and one or more of the keys (e.g., root key) loaded on the component. Once deployed into the Cable TV system, the device can be authorized by the new key thereby allowing the device (and any other device in the same product class (e.g., family)) to function in the cable system. For example, the service provider can receive (e.g., from the device manufacturer) and store the new key, or related key (e.g., mathematically related, cryptographically related) in a database. The service provider can authorize the device by sending a message to the device. The message can be encrypted based on the new key or related key, and the device can decrypt the message based on the new key stored on the device to authorized and/or deliver a service. In another aspect, the message can comprise the new key and the device can match the new key in the message with the new key on the device to authorize and/or deliver a service. Accordingly, the disclosed methods and systems can enable a device manufacturer, a product manufacturer (e.g., original equipment manufacturer), service provider, and/or the like to associate a specific key or sequence of keys with a service and/or class (e.g., grouping, level, tier) of services, a hardware feature, a function of a device, a product (e.g., device, application), a class of product (e.g., class of device, class of application and/or feature), and/or the like.

FIG. 1 illustrates a block diagram of an exemplary system for key generation. As an example, the device 101 can comprise a computer, a smart device (e.g., smart phone, smart watch, smart glasses, smart apparel, smart accessory), a laptop, a tablet, a set top box, PDA, a display device (e.g., television, monitor), digital streaming device, proxy, gateway, transportation device (e.g., on board computer, navigation system, vehicle media center), sensor node, communications terminal, digital terminal adapter (e.g., DTA, HD DTA, RDTA, UDTA, leased DTA), and/or the like.

A root key 102 and a product class identifier 103 can be loaded on the device 101. In an aspect, one or more root keys 102 can be loaded prior to the manufacture of the device 101. For example, one or more root keys can be loaded to a component, such as system on chip (SoC), an application specific integrated circuit (ASIC), an integrated circuit, a field programmable gate array (FPGA), a combination thereof, and/or the like. The manufacturer of the device 101 can subsequently install the component as a part of the device 101 when the device 101 is manufactured. Thus, one or more root keys 102 can be loaded to the device 101 prior to when the product class identifier 103 is loaded to the device 101.

In an aspect, the product class identifier 103 can be provided by the manufacturer of the component, device manufacturer, and/or the like in a manufacturing process. The product class identifier 103 can be a new identity to ensure that individual product models can be securely identified without having to track serial numbers or other device identities. In an aspect, the product class identifier 103 can be associated with a product class (e.g., product model, device class), a service, a class of services, and/or the like. For example, variations of a device can be manufactured as a variety of product classes. As an illustration, a device, such as a digital terminal adapter (DTA), can be manufactured according to the following product classes (e.g., device classes): high definition (HD) DTA, universal DTA (UDTA), leased DTA, retail DTA, and/or the like. Each product class can be associated with a corresponding product class identifier. For example, the HD DTA can have a specific product class identifier, whereas the UDTA can have a different product class identifier. As another example, the product class identifier can also identify a vendor, manufacturer (e.g., device manufacturer), service provider, customer, location, and/or the like.

In an aspect, the device 101 can comprise a key creation element 104 configured to create one or more new keys. The key creation element 104 can comprise a key creation function 105. In an aspect, the key creation function 105 can be determined by the manufacturer of the device 101. The key creation function can be based on RSA, EC, and/or AES symmetric key generation techniques. For example, the key creation function 105 can be configured to bind one or more identifiers and/or keys. Example identifiers can comprise device identifiers, root identifiers, product class identifiers, and/or the like. Example keys can comprise device keys, root keys, product class keys, and/or the like. A key can be configured to encrypt, decrypt, lock, unlock, and/or otherwise manage access to information, data, content, features, hardware components, and/or the like. An identifier can be an identifier generated by a manufacturer, a service provider, a content provider, a user, and/or the like.

In an aspect, one or more product class identifiers can be bound with one or more root identifiers, root keys, device identifiers, device keys, product identifiers, product keys, and/or the like. Binding can comprise combining two or more identifiers and/or keys via a cryptographic function (e.g., designed to take multiple inputs and produce one encrypted output), prepending, appending, and/or otherwise combining two identifiers and/or keys as one unit. For example, the system (e.g., key creation function 105) can use a variety of product identifiers of varying layers of abstraction to distinguish specific products, services, product families, service families, manufacturers, manufacturing lines, customer service differentiators, and/or the like. For example, the product identifier can comprise a product class identifier 103 configured to identify a class of products, devices, and/or the like. The class of products, devices, and/or the like can be based on a common model number, feature, function, subscription tier, hardware component, manufacturing location, current location (e.g., customer location, deployment location), and/or the like.

The key creation element 104 can access the root key 102 and the product class identifier 103 of the device 101, and create a new key (e.g., or secure identifier), by applying the key creation function 105 to the product class identifier 103 and the root key 102. The new key can be part of a chain of keys as described further herein. Multiple keys can be combined into a chain of keys by cascading (e.g., adding layers of encryption and/or encrypted data according to a precise, ordered sequence). For example, the new can be key 1 of chain 1 (e.g., chain 1-key 1) or key 1 of chain 2 (e.g., chain 2-key 1). The new key can comprise a unique key. Uniqueness, entropy, and/or other properties of the new key can be verified, confirmed, tested, and/or the like as is known in the art. In an aspect, the new key can be stored permanently in the device 101. In another aspect, the new key can be transmitted to a remote device, such as a service provider server.

In an aspect, the key creation function 105 can comprise any type of key (e.g., encryption key) generation algorithm. The key generation algorithm can be supplemented with additional functionality. For example, the key generation algorithm can be used together with another process, such as a cryptographic function, to append, hash or otherwise create a value (e.g., secure value) for each product class by using the product class identifier as an input. As a further explanation, the product class identifier 103 can be provided to the key creation function 105 via a non-reversible and/or non-reusable path (e.g., cascading one way function or Fuse). For example, the key creation function 105 can generate a non-reversible key (e.g., new key) and/or comprise a non-reusable key creation function 105. In an aspect, the key creation function 105 can comprise a hashing function, such as secure hash algorithm (e.g., SHA-256), and/or the like. For example, the hashing function can create at least a portion of the new key from the product class identifier 103. As an example, the key creation function 105 may hash with, append, or otherwise associate a non-deterministic value, such as a random number or a pseudo-random number, with an encrypted and/or unencrypted product class identifier 103.

In an aspect, the new key can function, be used as, or otherwise be implemented as a secure identifier (e.g., cryptographic identifier). For example, the new key can be a cascading identifier (e.g., identifier resulting from a cascading one way function), which can be a unique identifier for a specific product usage. In an aspect, the secure identifier can be configured and/or implemented in a system for cloning prevention, product tracking, and segregation of services tied only to associated secure identifiers. For example, the new key can be used as a secret cryptographic identity unique for each device, service, class of devices, and/or the like which is embedded into corresponding devices. The new key can be used to identify, track, provide services to, deny services to, and/or otherwise mange individual product models.

In an aspect, the key creation function 105 can vary among devices. For example, the key creation function 105 can be selected or otherwise determined according to the architecture of the device 101. The key creation function 105 can be designed by each manufacturer to fit within the robustness rules and architecture of the manufacturer's keying product requirements. In some implementations, identifiers (e.g., product class identifier) and/or keys (e.g., root key, new key, driver keys) can be generated remotely from the device 101 on which the identifier and/or key is later stored. For example, identifiers and/or keys can be provided to (e.g., injected in the factory line) and stored securely on the device 101 in encrypted storage, such as encrypted flash storage, non-modifiable storage, and/or the like.

In an aspect, the key creation function 105 can be determined by the manufacturer of the device 101 to fit within robustness rules and the architecture of one or more keying product requirements. Robustness rules for different product lines may vary widely depending upon the security level desired and/or specified for that product. Robustness rules can be configured to ensure that tampering, cloning, theft and disruption does not occur. Robustness rules can be selected based on the desired security level for protection of specific products and services. For example, in one implementation, the robustness rules can specify (e.g., require) the use of tamper resistant memory. In another implementation, the robustness rules can specify (e.g., require) the use of encryption on data stored in memory.

In an aspect, one or more chains of keys can be created based on the root key 102, product class identifier 103 and key creation function 105. For example, a first chain of keys can be created based on a first portion (e.g., first six digits) of the product class identifier 103, whereas a second chain of keys can be created based on a second portion (e.g., last six digits) of the product class identifier 103. For example, chain 1-key 1 can be a key which includes the cascaded product class identifier 103 incorporated into its cryptographic identity. Similarly, any number of keys can be similarly created (e.g., chain 1-key 2, chain 2-key 1, chain 2-key 2, etc.). In an aspect, at least one key chain can be based on using the cascading one way function to support product identity. When more than one than one root key 102 is loaded to the device 101, a first chain of keys can be created based on a first root key, whereas a second chain of keys can be created based on a second root key. As another example, the first chain of keys can be associated with a network access service, whereas the second chain of keys can be associated with a telephone service. As another example, the first chain of keys can be associated with pay per view service, whereas the second chain of keys can be associated with video on demand service. As another example, the first chain of keys can be associated with a display function of the device 101, whereas the second chain of keys can be associated with an audio function of the device 101.

In an aspect, a key or a sequence of keys (e.g., created by the key creation function 105) based on the product class identifier 103 or other generated identifier can be associated with a hardware feature of a class of product or an individual product (e.g., device 101). For example, the hardware feature can comprise one or more of an audio sensor, a vibration sensor, a light sensor, a motion sensor, a position sensor, a display, a speaker, a camera, a communication module, a power supply, a ringer, a backlight, a user interface, a timer, a memory, a specific chip or circuit, and the like. As an illustration, a key or a sequence of keys can be associated with the state (e.g., enabled or disabled) of hardware (e.g., a camera) installed on the device 101 or a class of product similar to the device 101. As an additional illustration, a key or sequence of keys can be associated with a state of a service offering. For example, a first state can comprise authorization of a video service at a particular video resolution, such as high definition (e.g., 1080p, 720p) on one class of devices (e.g., HD enabled DTA). As another example, another state can comprise authorization of a lower video resolution, such as standard definition (e.g., 480p), for another class of devices (e.g., other DTAs).

In an aspect, a key or a sequence of keys can be associated with the state (e.g., enabled or disabled) of a function of a product class and/or an individual product (e.g., the device 101). In an aspect, a function can comprise a display function, an audio function, a location awareness function, a communication function, and other operational function, and/or the like. As an illustration, a key or a sequence of keys can be associated with the state (e.g., enabled or disabled) of a location awareness function (e.g., GPS function) associated with the device 101. Keys associated with a specific state can be generated and/or derived at a device (e.g., on a chip of the device) on an as needed basis. In an aspect, keys can be associated with various states. The device 101 can comprise a rule enforcement engine configured to ensure that specific keys are only used when the device 101 is in a state (e.g., enabled, disabled) corresponding to the keys. Additionally, if the state changes for specific services associated with the key, the keys can be regenerated for updated usage or at a minimum revoked from continued use.

In an aspect, a key or a sequence of keys can associate a service and/or class (e.g., grouping, level, tier) of services with a class of product and/or an individual product (e.g., device 101). By way of example, the service and/or class of services can comprise a communication session service, a network access service, a video service, an audio service, a short message service, a multimedia message service, and/or the like. As an illustration, a key and/or a sequence of keys can be used to authorize a class of product or an individual product (e.g., device 101) to access a HD channel, a pay per view service, a video on demand service, and/or the like. In an aspect, the service and/or class of services can comprise a service for a particular subscription level. For example, a key and/or a sequence of keys (e.g., and corresponding device) can be associated with an unlimited subscription, a temporary subscription (e.g., 10 days), a trial subscription (e.g., 5 days), and the like. In an aspect, a service and/or class of services can comprise services associated with a particular licensing level. As an example, the licensing level can comprise a number of permitted users, a number of instances for a user to use the service, a time span to use the service (e.g., permanent license, temporary license), and/or the like.

Figure 2:
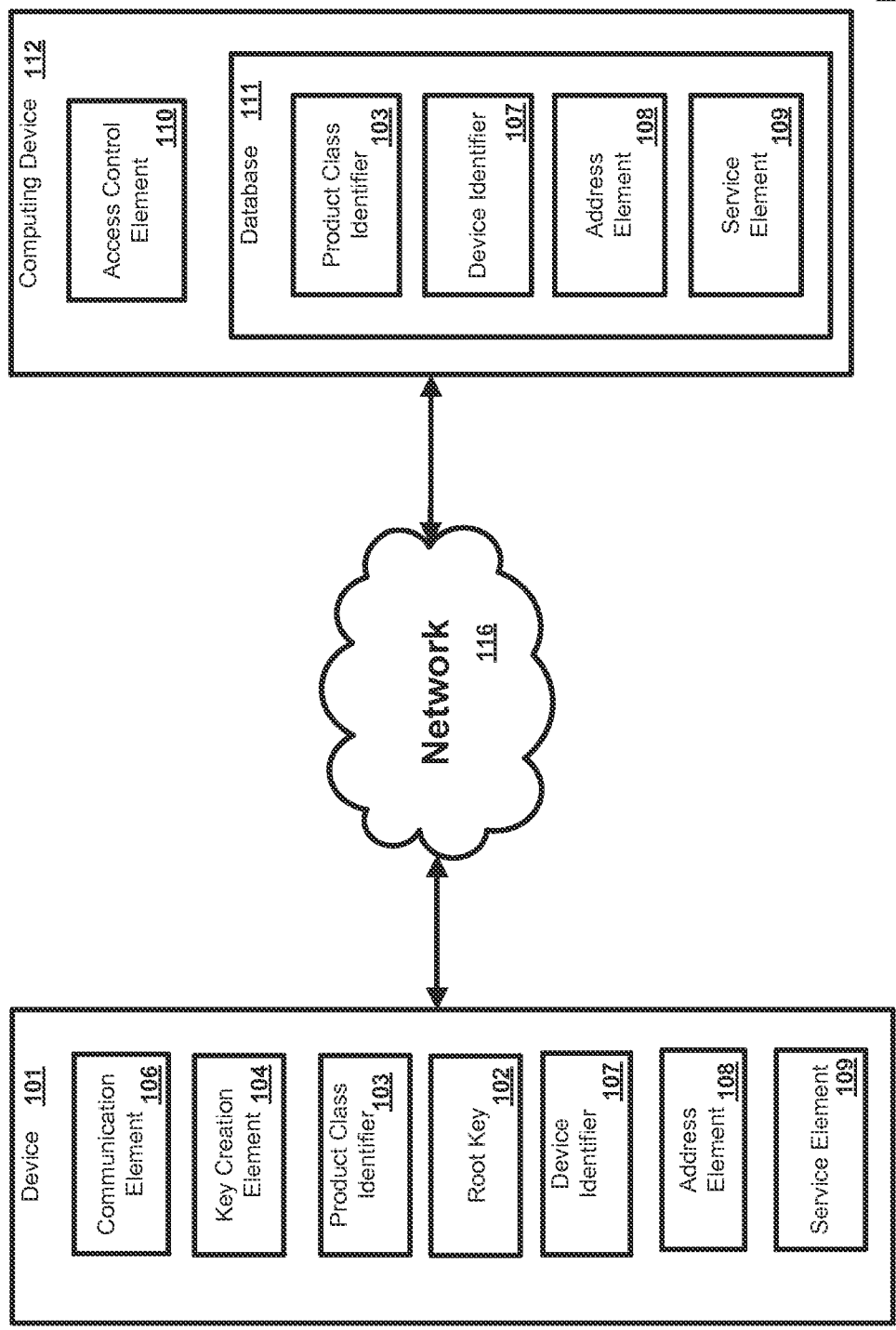
FIG. 2 is a block diagram of an another example system.

FIG. 2 illustrates various aspects of an exemplary environment in which the present methods and systems can operate. The present disclosure is relevant to systems and methods for providing services to a device, for example, a user device (e.g., the device 101), such as a computer, a tablet, a mobile device, a communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network, such as the Internet or other remote resources, provide address and/or configuration services like DHCP, and/or provide naming or service discovery services for a premises, or a combination thereof. Those skilled in the art will appreciate that the present methods may be used in various types of networks and systems that employ both digital and analog equipment. One skilled in the art will appreciate that provided herein is a functional description and that the respective functions can be performed by software, hardware, or a combination of software and hardware.

The system can comprise a device 101 in communication with a computing device 112 (e.g., a service provider). The computing device 112 can be disposed locally or remotely relative to the device 101. As an example, the device 101 and the computing device 112 can be in communication via a private and/or public network 116 such as the Internet or a local area network. Other forms of communication can be used such as wired and wireless telecommunication channels, for example.

In an aspect, the device 101 can be a computer, a smart device (e.g., smart phone, smart watch, smart glasses, smart apparel, smart accessory), a laptop, a tablet, a set top box, PDA, a display device (e.g., television, monitor), a digital streaming device, a proxy, a gateway, a transportation device (e.g., on board computer, navigation system, vehicle media center), a sensor node, a communications terminal, a digital terminal adapter and/or other device capable of communicating with the computing device 112. As an example, the device 101 can comprise a communication element 106 for providing an interface to a user to interact with the device 101 and/or the computing device 112. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the device 101 and the computing device 112. As an example, the communication element 106 can request or query various files from a local source and/or a remote source. As a further example, the communication element 106 can transmit data to a local or remote device such as the computing device 112.

In an aspect, the device 101 can be associated with a product class identifier 103. As an example, the product class identifier 103 can be an identifier, a token, character, a string, a code, a value, or the like, for differentiating one product from another product. For example, an HD digital terminal adapter (DTA) can have a specific product class identifier, whereas a universal digital terminal adapter (DTA) can have a different product class identifier. The product class identifier 103 can comprise a code or a value such as a universal product code (UPC), an article number, an international standard book number, a manufacturer part number, and the like, associated with an individual product. In an aspect, the product class identifier 103 can identify a user or user device as belonging to a particular class of users or user devices. In another aspect, the product class identifier 103 can comprise information relating to the device 101, such as a manufacturer, a model or type of device, a service provider associated with the device 101, a state of the device 101, a locator, and/or a label or classifier. Other information can be represented by the product class identifier 103. In an aspect, the product class identifier 103 can be stored in the device 101 and retrieved by one or more remote devices such as the computing device 112.

In an aspect, the device 101 can be associated with a user identifier or device identifier 107. As an example, the device identifier 107 can be an identifier, a token, a character, a string, or the like, for differentiating one user or user device (e.g., device 101) from another user or user device. Other information can be represented by the device identifier 107. For example, the device identifier can be a non-encrypted identifier stored on a component (e.g., SoC, ASIC) of a device. A product class identifier 103 can identify a component of a device, a specific product within a product family, a product family, products associated with (e.g., destined to) specific customers, and/or the like. Product class identifiers can be created according to a variety of layers of abstraction. For example, product class identifiers can be created for individual components, classes of products, organizations manufacturing products, and/or the like. Product class identifiers can be created for a variety of purposes, such as to track, bind, and/or cryptographically protect specific elements, devices, services and/or features.

In an aspect, the product class identifier 103 and/or the device identifier 107 can be associated with an address element 108. In an aspect, the address element 108 can comprise or provide an internet protocol address, a network address, a media access control (MAC) address, an Internet address, or the like. As an example, the address element 108 can be relied upon to establish a communication session between the device 101 and the computing device 112 or other devices and/or networks. As a further example, the address element 108 can be used as an identifier or locator of the device 101. In an aspect, the address element 108 can be persistent for a particular network. In an aspect, the device identifier 107 and/or the address element 108 can be stored in the device 101 and retrieved by one or more remote devices such as the computing device 112.

In an aspect, the product class identifier 103 and/or the device identifier 107 can be associated with a service element 109. In an aspect, the service element 109 can comprise an identification of a service provider associated with the device 101 and/or with the class of device 101. The class of the device 101 can be related to a type of device, a capability of device, a class of services being provided, and/or a level of service (e.g., business class, service tier, service package, etc.). As an example, the service element 109 can comprise information relating to or provided by a communication service provider (e.g., Internet service provider) that is providing or enabling data flow such as communication services to the device 101. As a further example, the service element 109 can comprise information relating to a preferred service provider for one or more particular services relating to the device 101. Other information can be represented by the service element 109. In an aspect, the service element 109 can be stored remotely from the device 101 and retrieved by one or more devices such as the device 101 and the computing device 112.

In an aspect, the device 101 can comprise a key creation element 104. As explained further herein, the key creation element 104 can generate one or more keys based on a product class identifier 103. For example, the key creation element 104 can access a root key 102, the product class identifier 103, and apply a predetermined key creation function 105 to the root key 102 and product class identifier 103. The root key 102 can comprise an encryption key stored (e.g., permanently) a component of the device 101. For example, the component manufacturer can generate and store the root key 102 on the component. The root key 102 can be unique to the component of the device 101. The key creation function 105 can be based on RSA, EC, and/or AES symmetric key generation techniques. For example, the key creation function 105 can receive the root key 102 and product class identifier 103 as inputs. The key creation function 105 can output one or more new keys. For example, the key creation function 105 can apply a hash function to the product class identifier 103 and append or prepend the hashed product class identifier to the root key 102. As another example, the key creation function 105 can combine the root key 102 and product class identifier 103 by encrypting the root key 102 together with the product class identifier 103.

The one or more new keys generated by the key creation element 104 can be stored in the device 101. For example, the device 101 can store the one or more new keys in secure storage, such as encrypted storage. The secure storage can be permanent or temporary. For example, additional product class identifiers and/or updated product class identifiers can be received by the device 101. For example, as services are updated and/or new services are implemented for the device 101, additional and/or updated product class identifiers (e.g., associated with the new services) can be generated and transmitted to the device 101 by a service provider, device manufacturer, and/or the like. The device 101 can generate additional keys based on the additional product class identifiers and/or updated product class identifiers.

In an aspect, the computing device 112 can be a server for communicating with the device 101. As an example, the computing device 112 can communicate with the device 101 for providing data and/or services. As an example, the computing device 112 can provide services such as network (e.g., Internet) connectivity, network printing, media management (e.g., media server), content services (e.g., video, audio), streaming services, broadband services, or other network-related services. In an aspect, the computing device 112 can allow the device 101 to interact with remote resources, such as data, devices, and files.

In an aspect, the computing device 112 can manage the communication between the device 101 and a database 111 for sending and receiving data therebetween. As an example, the database 111 can store a plurality of files (e.g., web pages), user identifiers or records, or other information. As a further example, the device 101 can request and/or retrieve a file from the database 111. In an aspect, the database 111 can store information relating to the device 101, such as the address element 108 and/or the service element 109. As an example, the computing device 112 can obtain the device identifier 107 from the device 101 and retrieve information from the database 111 such as the address element 108 and/or the service element 109. As a further example, the computing device 112 can obtain the address element 108 from the device 101 and can retrieve the service element 109 from the database 111, or vice versa. In an aspect, one or more created keys can be stored in the database 111. For example, the database 111 can store one or more created keys and a device setting (e.g., setting of a hardware feature, setting of a function, setting of a service) associated with the device 101. Any information can be stored in and retrieved from the database 111. The database 111 can be disposed remotely from the computing device 112 and accessed via direct or indirect connection. The database 111 can be integrated with the computing device 112 or some other device or system.

In an aspect, the computing device 112 can comprise an access control element 110. The access control element 110 can manage and/or control access of the device 101 to a specific service provided by the computing device 112 and/or hardware feature managed by the computing device 112. For example, the access control element 110 can access one or more keys associated with the device 101 and identify services associated with the one or more keys. For example, the access control element 110 can receive the one or more keys from the device 101. The access control element 110 can determine an entitlement (e.g., subscription level, licensing level) of the device 101 to access a specific service according to the one or more keys. In an aspect, the access control element 110 can decrypt information for one or more services and provide the decrypted information for the service to the device 101 (e.g., based on one or more keys generated by the key creation element 104). In another aspect, the access control element 110 can compare the one or more keys associated with the device 101 to one or more reference keys (e.g., stored by the computing device 112) associated with services, hardware features, and/or the like. If the one or more keys received from the device match any of the reference keys, the access control element can activate and/or deactivate a corresponding service, hardware feature, and/or the like for the device 101 based on the matched reference keys. For example, the access control element 110 can transmit an instruction to the device 101 to activate and/or deactivate the service, hardware feature, and/or the like.

Figure 3:
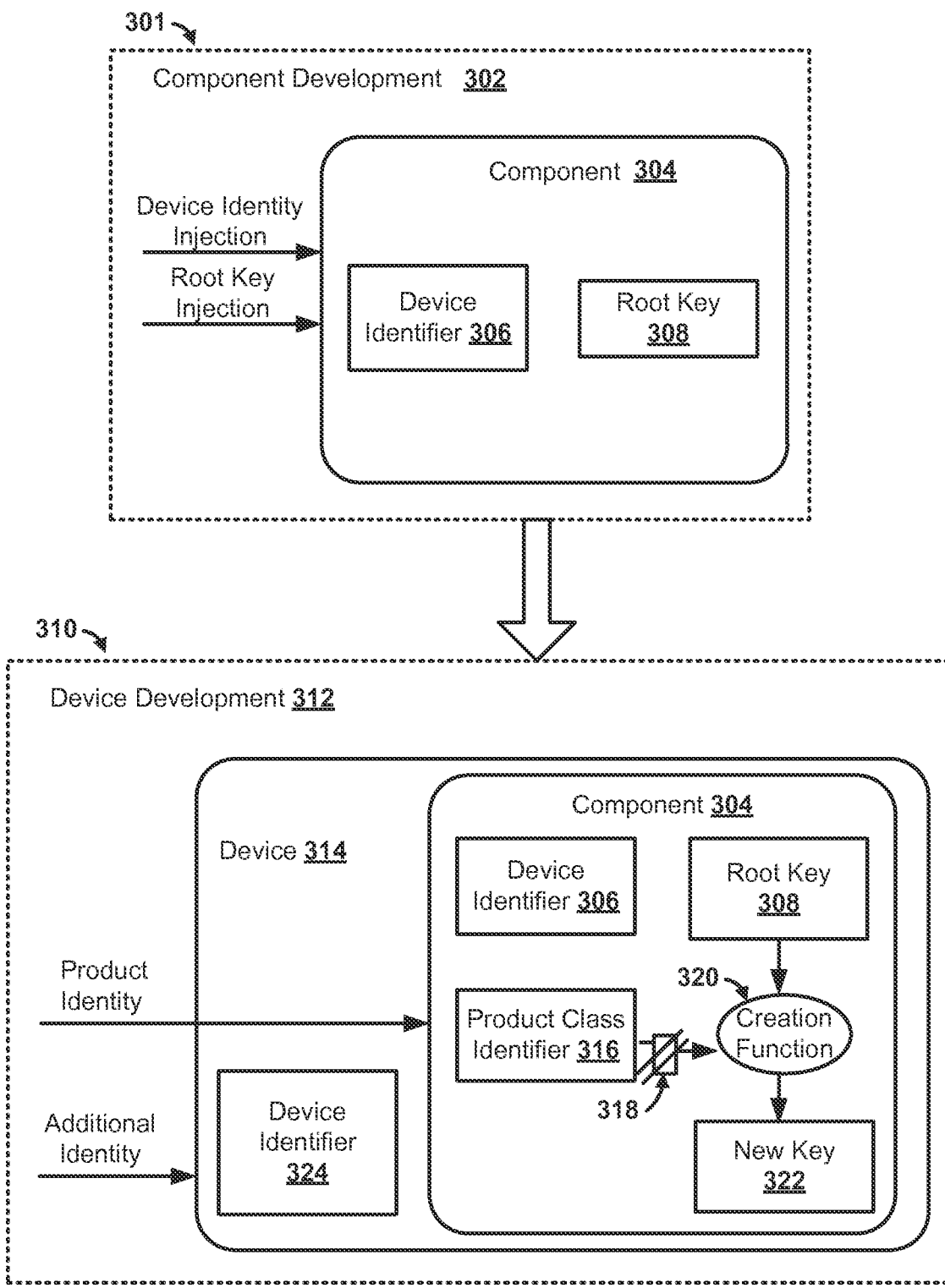
FIG. 3 is a diagram illustrating an example process flow.

FIG. 3 is a diagram illustrating an exemplary process (e.g., product manufacturing) flow. A first process 301 can be performed by a first party (e.g., first manufacturer) and/or second party (e.g., second manufacturer). As an example, the first process 301 can be performed at one or more first locations. The first party and/or second party can be a component developer, component, manufacturer, and/or the like. The first process 301 can comprise component development 302 (e.g., component manufacturing). For example, the first process can comprise manufacturing, developing, and/or the like, at least in part, a component 304. For example, the component can comprise a system on chip (SoC), application specific integrated circuit (ASIC), integrated circuit (IC), field programmable gate array (FPGA), and/or the like. A device identifier 306 can be generated and securely inserted in the component 304. For example, the device identifier can comprise a media access control (MAC) address. A root key 308 can be generated and securely inserted into the component 304.

A second process 310 can be performed by the first party and/or a second party. The first party and/or second party can be a device manufacturer. The second process 310 can comprise device development 312 (e.g., device manufacturing). The second process 310 can be performed at the one or more first locations (e.g., managed by the first party) or at one or more second locations (e.g., managed by the second party). In an aspect, the component 304 can be placed, assembled, and/or the like into a device 314 at a device manufacturing facility managed by the first party and/or second party. For example, the component 304 can be placed, assembled, and/or the like in to a device 314, such as a DTA, a set top box, a gateway, a mobile device, a television, and/or the like. A product class identifier 316 can be assigned to the device 314 (e.g., by the device manufacturer, service provider, network services provider, etc., or a combination thereof). The product class identifier 316 can be associated with all devices of a particular manufacturer, model, series, edition, and/or the like. The product class identifier 316 can identify a component of a device, a specific product within a product family, a product family, products associated with (e.g., destined to) specific customers, and/or the like. The product class identifier 316 can be created according to a variety of layers of abstraction. For example, the product class identifier 316 can be created for individual components, classes of products, organizations manufacturing products, and/or the like. The product class identifier 316 can be created for a variety of purposes, such as to track, bind, and/or cryptographically protect specific elements, devices, services and/or features. The product class identifier 316 can be associated with a particular class of service, level of service, and/or the like (e.g., for a specific service provider and/or network provider).

In an aspect, the product class identifier 316 can be provided to the component 304 via a non-reusable and/or non-reversible path 318. The product class identifier 316 can be passed through a cryptographic creation function 320 with the root key 308 thereby generating a new key 322 (e.g., a product class key) that is cryptographically bound to the root key 308. The new key 322 can be stored in the component 304. An additional device identifier 324 (e.g., a serial number) can be generated by the device manufacturer. The additional device identifier 324 can also be placed in the device 314.

As an illustration, both the first process 301 and the second process 310 can be performed by the same party, such as the first party or second party. For example, the component 304 and the device 314 can be manufactured by the first party. As another illustration, the first process 301 can be performed by the first party, and the second process 310 can be performed by the second party. For example, the first party can manufacturer the component 304, and the second party can manufacturer the device 314 using, at least in part, the component. The component 304 can be sent (e.g., shipped) along with other components (e.g., same or similar components) from the first party to the second party (e.g., or from a first location to a second location of the first party) where the component can be incorporated into different devices of a variety of product classes. The product class identifier 316 can be determined by the first party, second party, a third party (e.g., network provider, service provider), and/or the like.

Figure 4:
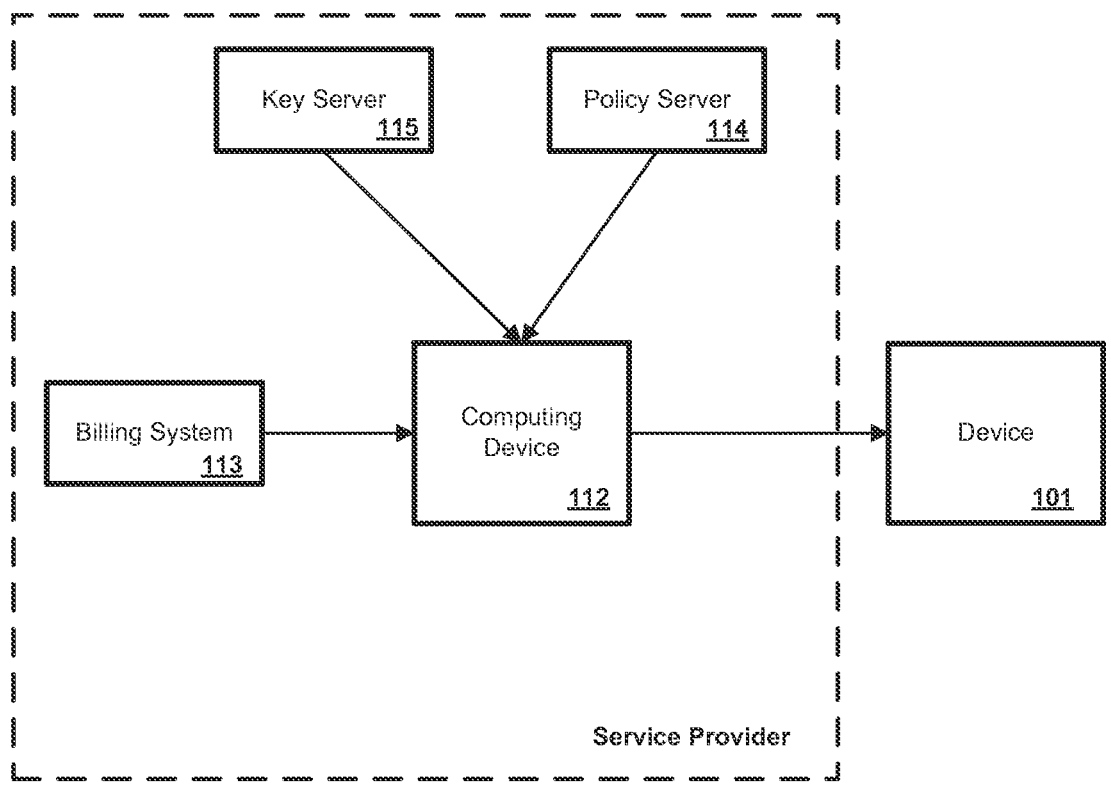
FIG. 4 is a block diagram of an example system.

FIG. 4 illustrates various aspects of an exemplary system in which the present methods can operate. An exemplary method can be implemented using one or more of a device 101, a computing device 112, a billing system 113, a policy server 114, and a key server 115. Such devices, systems, and services can be provided, managed, hosted, and/or the like by one or more service providers.

In an aspect, the device 101 can comprise a computer, a smart device (e.g., smart phone, smart watch, smart glasses, smart apparel, smart accessory), a laptop, a tablet, a set top box, PDA, a display device (e.g., television, monitor), a digital streaming device, a proxy, a gateway, a transportation device (e.g., on board computer, a navigation system, vehicle media center), a sensor node, a communications terminal, a digital terminal adapter (e.g., DTA, HD DTA, RDTA, UDTA, leased DTA), and/or the like. In an aspect, the device 101 does not need to be in a fixed location. The device 101 can be deployed in any location convenient for communication with the computing device 112. In an aspect, one or more keys (e.g., set of keys, sequence of keys) can be generated and stored in the device 101 as described herein. In an aspect, the one or more keys can be associated with a hardware feature of the device 101. In another aspect, the one or more keys (e.g., or a portion thereof) can be associated with the state (e.g., enabled or disabled) of a function of the device 101. In an aspect, the one or more keys can be used to associate a service and/or type (e.g., class) of service with the device 101.

In an aspect, the computing device 112 can comprise a server for communicating with the device 101. As an example, the computing device 112 can communicate with the device 101 for providing data and/or services. As an example, the computing device 112 can provide services such as network (e.g., Internet) connectivity, network printing, media management (e.g., media server), content services (e.g., video, audio), streaming services, broadband services, or other network-related services. In an aspect, the computing device 112 can allow the device 101 to interact with remote resources, such as data, devices, and files. As an example, the computing device 112 can be configured as (or disposed at) a central location (e.g., a headend, or processing facility), which can receive content (e.g., data, input programming) from multiple sources. The computing device 112 can combine the content from the multiple sources and can distribute the content to user (e.g., subscriber) locations or user device (e.g., device 101) via a distribution system.

In an aspect, the computing device 112 can be communicatively coupled to a billing system 113. The billing system 113 can comprise entitlement information of the device 101 and/or a user of the device 101. For example, the entitlement information can indicate authorization or lack of authorization for a specific service (e.g., HD service), a hardware feature (e.g., camera), and/or a function (e.g., location awareness function) of the device 101. The billing system 113 can be disposed remotely from the computing device 112 and accessed via direct or indirect connection. The billing system 113 can be integrated with the computing device 112 or some other device or system.

In an aspect, the computing device 112 can be communicatively coupled to a policy server 114. As an example, the policy server 114 can store service information (e.g., service element 109), product class identifiers, device identifiers (e.g., device identifier 107, address element 108) or records, or other information related to the device 101. As an example, service information can comprise services, classes (e.g., groupings, levels, tiers) of services, subscription levels associated with a service and/or class of services, a licensing level associated with a service and/or class of services, and/or the like.

The policy server 114 can provide authorization of a service and/or class of services to the device 101 and facilitate tracking and control of files related to the service and/or class of services. As an example, the policy server 114 can receive an access control request from the computing device 112, process the request against a set of statements that define how a service provider's resources can be allocated to the device 101, and return an access control response to the computing device 112. In an aspect, the policy server 114 can allocate the service provider's resources based on authorization privileges of the device 101, availability of network resources, and any other factors. In another aspect, the policy server 114 can allow or deny access, and/or control the extent to which a device (e.g., device 101) can use a service (e.g., HD service, pay per view service, video on demand service). The policy server 114 can be disposed remotely from the computing device 112 and accessed via direct or indirect connection. The policy server 114 can be integrated with the computing device 112 or some other device or system.

In an aspect, the computing device 112 can be communicatively coupled to a key server 115. The key server 115 can be disposed remotely from the computing device 112 and accessed via direct or indirect connection. The key server 115 can be integrated with the computing device 112 or some other device or system. As an example, the key server 115 can store a plurality keys (e.g., including the one or more keys or related keys), product class identifiers, device identifiers (e.g., device identifier 107, address element 108) or records, or other information related to the device 101. As a further example, the computing device 112 can request and/or retrieve one or more of the plurality of keys from the key server 115 according to a setting of the device 101 (e.g., subscription level, licensing level to access a service) determined at the billing system 113 and/or the policy server 114.

As an example, the computing device 112 can be configured to access the billing system 113 to determine that the device 101 and/or a user of the device 101 is entitled to access a specific service (e.g., HD service). The computing device 112 can access the policy server 114 to determine the level (e.g., subscription level, licensing level) of the specific service (e.g., HD service) related to the device 101. The computing device 112 can then access the key server 115 to identify (e.g., from among the plurality of keys) one or more keys associated with the determined level of the specific service associated with the device 101. In an aspect, the computing device 112 can transmit the identified one or more keys to the device 101. The identified one or more keys can be used for activation and/or deactivation of the specific service (e.g., HD service) to the device 101. For example, the one or more keys can be transmitted to the device 101. Upon matching the one or more transmitted keys to one or more keys stored on the device 101, the device 101 can activate and/or deactivate a service. As a further example, the service can be provided based on the one or more keys. For example, information (e.g., data, video, audio) related to the service can be encrypted based on the identified one or more keys. The device 101 can decrypt the information related to the service based on one or more keys stored on the device 101. Then the device 101 can provide (e.g., to a user via a display or other device) the decrypted information as part the service.

Figure 5:
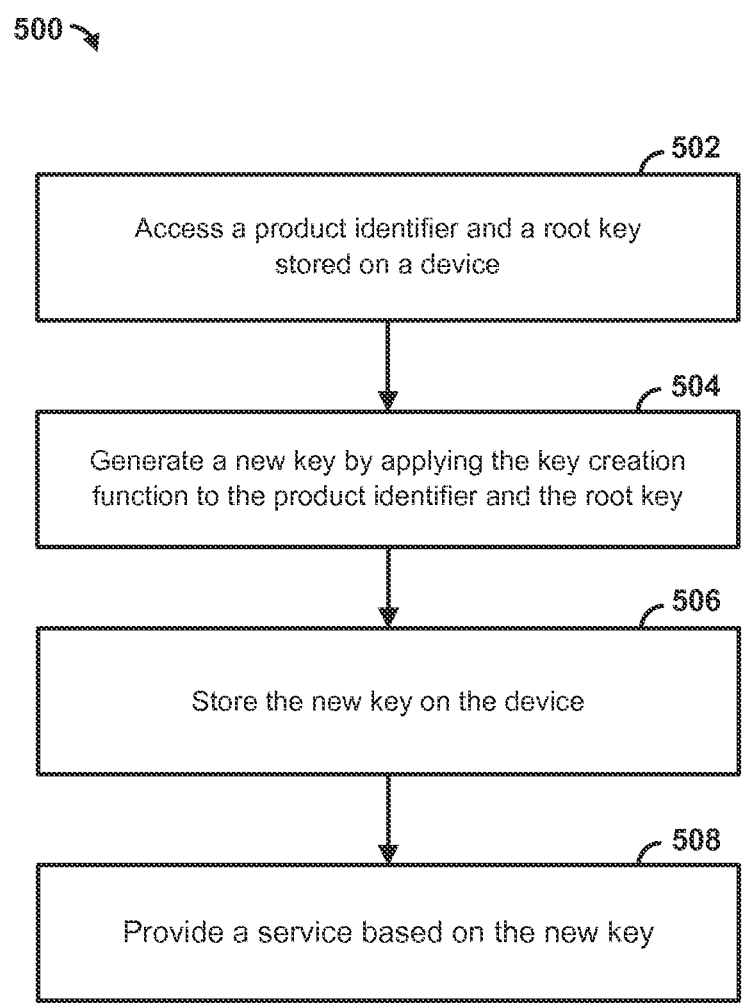
FIG. 5 is a flowchart illustrating an example method.

FIG. 5 is a flowchart illustrating an example method 500 for key generation. In an aspect, a key creation function can be determined (e.g., by a manufacturer, service provider). In an aspect, the key creation function can be determined according to the architecture of the device 101. For example, the architecture can dictate implementation specifics for cryptographic strength, hardware or software, robustness, or other product requirements. The key creation function can be determined by the manufacturer of the device 101 to fit within robustness rules and architecture of one or more keying product requirements. For example, the robustness rules can be configured to ensure the key creation function cannot be altered during the lifetime of the product including any aspect of latency, storage, use, and/or the like. The implementation details can be specific to the product. For example, a robustness rule for a specific product can be to only allow hardware implementations that cannot be by-passed and/or altered after manufacture of the specific product. In an aspect, the key creation function can comprise a key generation algorithm. For example, the key generation algorithm could be any commonly known key generation algorithm, such as RSA, EC or AES symmetric key generation techniques. In an aspect, the key creation function can comprise a cryptographic function. The cryptographic function can be configured to receive a key and an identifier (e.g., product class identifier) and cryptographically bind the key with the identifier. As another example, the cryptographic function can be configured to receive the identifier and generate an encrypted result (e.g., encrypted identifier, key), which can be bound (e.g., combined as one unit) with the key (e.g., root key). For example, the cryptographic function can comprise a hash function to create portion of a key from an identifier (e.g., product class identifier). The key creation function can comprise a non-reversible key creation function. The key creation function can comprise a non-reusable key creation function.

At step 502, a product class identifier and a root key can be accessed. The product class identifier and the root key can both be stored on a device. For example, the product class identifier and the root key can be stored on the same component, such as a system on chip, application specific integrated circuit, field programmable gate array, and/or the like. As a further illustration, the key creation element 104 can retrieve the root key 102 and the product class identifier 103 from a memory (e.g., ROM) of the device 101. The memory can comprise encrypted memory, such as encrypted flash storage. The root key 102 and the product class identifier 103 can be stored in encrypted storage, permanent storage, and/or the like. In an aspect, the root key can be stored on a component of the device by a first manufacturer of the component. The product class identifier can be stored on the component by a second manufacturer of the device. For example, the first manufacturer can manufacture a plurality of components (e.g., copies of a specific component). The first manufacturer can store the root key on one or more (or each) of the components. The first manufacturer can provide (e.g., transport) portions of the plurality of components to a variety of manufacturers, such as the second manufacturer. The second manufacturer can determine a product class identifier for the device (e.g., based on the device belonging to a class of devices). For example the product class identifier can be associated with a class of devices. The class of devices can include the device. For example, the device can be a member of the class of devices.

At step 504, one or more new keys can be generated by applying the key creation function to the product class identifier and the root key. The one or more new keys can be generated by the second manufacturer. In an aspect, the one or more new keys can comprise a sequence of keys, such as a chain of keys generated by cascading multiple keys as described herein. For example, the root key 102 and/or the product class identifier 103 can be hashed together creating a bound identifier, or new key, that is unique. As another example, the one or more new keys can be generated by appending, prepending, and/or otherwise combining additional cryptographic data related to the product class identifier with a pre-existent key or other data. For example, the additional cryptographic data can comprise the result of a hash function applied to the product class identifier. As a further example, the new key can comprise a first portion based on the product class identifier and a second portion not based on the product class identifier. The first portion based on the product class identifier can be appended to the second portion not based on the product class identifier. The first portion based on the product class identifier can be a hash value based on the product class identifier. After generation of the one or more new keys (e.g., whether through appending or otherwise bounding together), the key creation function can support the application of additional keys to the one or more new keys, thereby generating (e.g., cascading) chains of keys as discussed further herein.

At step 506, the one or more new keys can be stored on the device. The one or more new keys can be stored on a component, such as the component on which root key and product class identifier are stored. In an aspect, the one or more new keys can be stored in an encrypted storage, a permanent storage, or a combination thereof. For example, a fuse can be blown and/or a circuit of the device can be otherwise altered, thereby causing storage to become permanent.

At step 508, a service can be provided based on the one or more new keys. For example, the one or more new keys can be used to manage access, manage content, manage quality levels, and otherwise provide one or more services, enable hardware and/or software features, and/or the like. The one or more new keys can be associated with one or more of a hardware feature of the device, a function of the device, the one or more services, a combination thereof, and/or the like. In an aspect, providing the service based on the one or more new keys can comprise authorizing access to the service based on the one or more new keys, decrypting information for the service based on the one or more new keys, encrypting information for the service based on the one or more new keys, and/or the like. For example, data (e.g., information, content) associated with the service can be transmitted to and/or received by the device. The data associated with the service can be encrypted (e.g., based on the one or more new keys or keys associated with the one or more new keys). The device can receive the data and decrypt the data based on at least a portion of the one or more new keys. The decrypted data can be provided (e.g., displayed) to a user and/or a module of the device configured to enable or disable services based on the data. As a further example, a service provider can be configured to provide the data to the device, thereby enabling the service, disabling the service, utilizing the service, and/or the like.

In an aspect, the one or more new keys can be associated with a hardware feature of a class of product or individual product. In an aspect, the hardware feature can comprise an audio sensor, a vibration sensor, a light sensor, a motion sensor, a position sensor, a display, a speaker, a camera, a communication module, a power supply, an operational function, a ringer, a backlight, a user interface, a timer, a memory, a specific chip or circuit, a combination thereof, and/or the like. For example, the one or more new keys can be associated with a state (e.g., enabled or disabled) of a component (e.g., camera) installed on the device 101 or a class of product similar to the device 101. For example, different classes of devices can be associated with different states of the component. For example, a first class of devices (e.g., HD DTA) can be associated with a high definition service setting of 'enabled.' while a second class of devices (e.g., RDTA, DTA) can be associated with a high definition service setting of 'disabled.' In an aspect, one or more new keys can be used to activate and/or deactivate a hardware feature (e.g., camera, HD service) of a product or a class of product (e.g., device 101 or a class of product similar to the device 101).

The one or more new keys can be used to provide the service by enabling, disabling, or otherwise managing one or more of the hardware features on the device. For example, the one or more new keys can be transmitted to the device 101. Upon matching the one or more transmitted keys to one or more new keys stored on the device 101, the device 101 can activate and/or deactivate a service. As a further example, the service can be provided based on the identified one or more new keys. For example, information (e.g., data, video, audio) related to the service can be encrypted based on the identified one or more new keys. The device 101 can decrypt the information related to the service based on one or more new keys stored on the device 101. Then the device 101 can provide (e.g., to a user via a display or other device) the decrypted information as part the service.

In an aspect, the one or more new keys can be associated one or more functions of a device and/or class of devices. For example, one or more new keys can be associated with a state (e.g., enabled or disabled) of a function, used to provide (e.g., decrypt, encrypt) data associated with the function, and/or otherwise used to manage the function. In an aspect, a function can comprise a display function, an audio function, a location awareness function, a communication function, operational function, and/or the like. In an aspect, the one or more new keys can be used to activate and/or deactivate a function of a product or a class of product (e.g., device 101 or a class of product similar to the device 101). For example, the one or more new keys can be used to activate and/or deactivate a location awareness function (e.g., GPS function) on the device 101 or a class of product similar to the device 101. For example, a message relevant to the location awareness function can be received by the device 101. The message can comprise one or more keys and/or be encrypted by one or more keys. As an example, upon matching the one or more keys of the message to the one or more new keys, the device can activate and/or deactivate the location awareness function. As another example, the device 101 can decrypt the message based on the one or more new keys thereby revealing an instruction to activate and/or deactivate the location awareness function.

In an aspect, the service can be associated (e.g., by a service provider) with the device and/or class of devices. By way of example, the service can comprise a communication session service, a network access service, a video service, a audio service, a short message service, a multimedia message service, and/or the like. For example, the one or more new keys (e.g., or keys, such as public keys, that correspond to the one or more new keys) can be used to authorize a class of devices and/or an individual device to access a HD channel, a pay-per-view service, a video on demand service. For example, each of the devices within the class of devices can generate and/or store corresponding one or more new keys. While the root key of each device may differ from other devices within the class, each of the devices can store the same or similar product class identifier. Accordingly, the one or more new keys of each of the devices of the class of devices can be based on the same or similar product class identifier. The service provider can then encrypt information and/or transmit one or more keys to the devices in a manner that allows the devices of the class of devices to decrypt the information based on the corresponding one or more new keys and/or match the one or more keys to the corresponding one or more new keys stored at the corresponding devices of the class of devices.

In an aspect, a level of service can be determined based on the one or more new keys. A level of service can comprise a subscription level (e.g., subscription tier). For example, the one or more new keys can be associated with unlimited subscription, temporary subscription (e.g., 10 days), trial subscription (e.g., 5 days), and/or the like. In another aspect, a level of service can comprise a licensing level. As an example, the licensing level can comprise the number of users permitted to use the service, number of instances for a user to use the service, time span to use the service (e.g., permanent license, temporary license), and/or the like. In an aspect, the one or more new keys can be used to define a level of service for the device or a class of devices (e.g., device 101 or a class of product similar to the device 101). For example, the one or more new keys can be used to activate and/or deactivate a service (e.g., pay-per-view service, video on demand service) on the device and/or the class of device.

Figure 6:
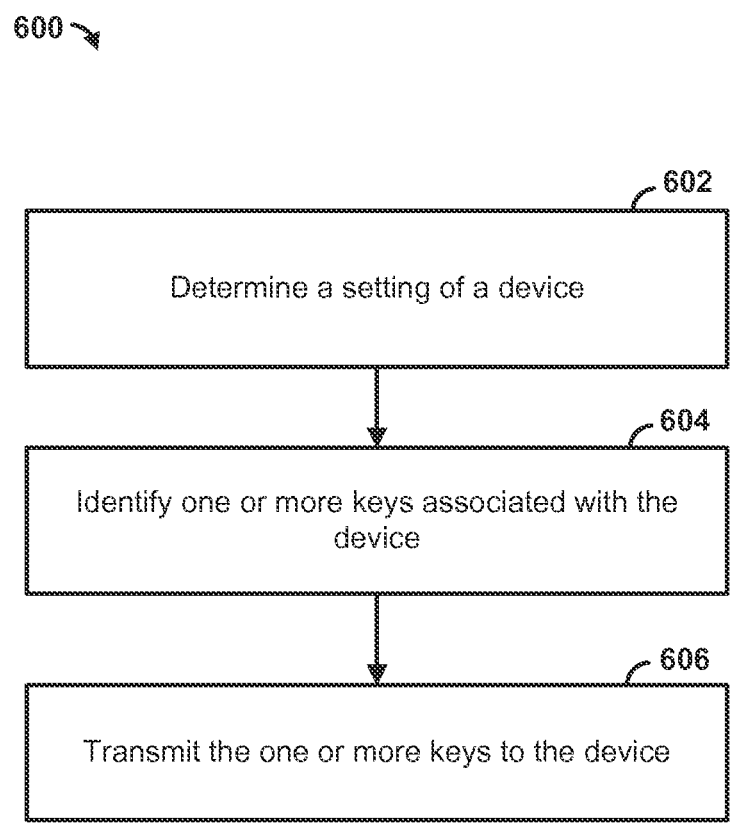
FIG. 6 is a flowchart illustrating an another example method.

FIG. 6 is a flowchart illustrating an example method 600. At step 602, a setting of a device can be determined. As an example, the setting (e.g., or status) of the device can comprise a setting of a hardware feature of the device, a setting of a function of the device, a setting of a service and/or class of services for the device, and/or the like. In an aspect, the setting of the device can be determined at the billing system 113 and/or the policy server as described in FIG. 4. As an example, the computing device 112 can be configured to access the billing system 113 to determine that the device 101 and/or a user of the device 101 is entitled (e.g., authorized) or not entitled (e.g., not authorized) to access a specific service (e.g., HD service). The computing device 112 can access the policy server 114 to determine the level (e.g., subscription level, licensing level) of the specific service (e.g., HD service) related to the device 101.

At step 604, one or more keys associated with the setting of the device can be identified. In an aspect, the one or more keys associated with the setting of the device can be identified at the key server 115 as described in FIG. 4. The computing device 112 can access the key server 115 to identify the one or more keys associated with the determined level of the specific service associated with the device 101. For example, the key server 115 can maintain a data store in which keys are associated with devices, classes of devices, services, classes of services, settings of devices, and/or the like. The computing device 112 can request the one or more keys from the policy server 114 based on a message indicating the device, class of device, service, class of service, setting of the device, and/or the like.

At step 606, the one or more keys can be transmitted to the device. In an aspect, the one or more keys can be transmitted to the device according to a device identifier (e.g., device identifier 107) of the device. The one or more keys can be used to perform one or more of activation and/or deactivation associated with the device. For example, the one or more keys can be compared, at the device, to one or more keys stored on the device. If the one or more keys match one or more keys on the device, then the device can activate and/or deactivate a service, hardware feature, and/or the like at the device. The one or more keys on the device can be based on a product class identifier, root key, and/or the like stored on the device.

In an aspect, performing one or more of activation and deactivation associated with the device can comprise activating a hardware feature of the device, activating a function of the device, activating a service and/or class of services for the device, deactivating a hardware feature (e.g., camera) of the device, deactivating a function (e.g., location awareness function) of the device, deactivating a service (e.g., HD service) and/or class of services to the device, and/or the like.

Figure 7:
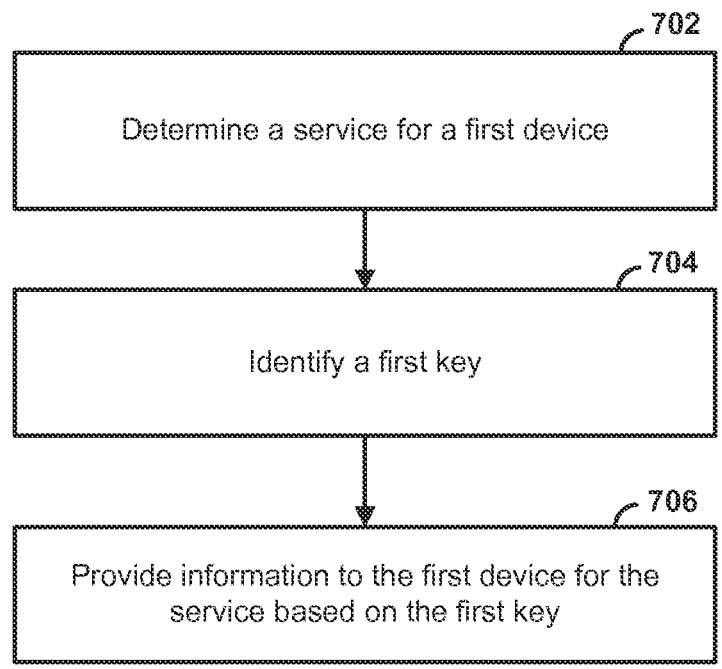
FIG. 7 is a flowchart illustrating an another example method.

FIG. 7 is a flowchart illustrating an example method 700. At step 702, a service can be determined for a first device. For example, the service can be determined, at a second device, by a service provider. For example, the service can comprise a content service, such as a video service (e.g., high definition video service, standard definition video service, ultra high definition service), an audio service, a gaming service, a program guide service, a social media service, a networking service (e.g., wireless access point service, Internet service), and/or the like. The service can comprise a location management service, such as a security service, a camera service, a temperature management service, a light management service (e.g., wireless light control), a door management service (e.g., wireless lock control), a sensor network service, and/or the like. The service can comprise a user management service, such as a user preferences service, a user history service, a subscription tier service, a content recording service, and/or the like.

In an aspect, the first device can comprise a computer, a smart device (e.g., smart phone, smart watch, smart glasses, smart apparel, smart accessory), a laptop, a tablet, a set top box, PDA, a display device (e.g., television, monitor), a digital streaming device, a proxy, a gateway, a transportation device (e.g., on board computer, navigation system, vehicle media center), a sensor node, a communications terminal, a digital terminal adapter (e.g., DTA, HD DTA, RDTA, UDTA, leased DTA), and/or the like.

As an example, the service provider can determine a class of devices to provide a service. The service provider can identify the first device as belonging to the class of devices. For example, the service provider can maintain a data store (e.g., database) that defines relationships between classes of devices and particular devices. The service provider can access the data store to identify all devices belonging to a particular class of devices. As another example, the service provider can determine the service for the first device based on receiving a request for the service from the first device. As a further example, the service provider can determine the service for the first device based on the first device qualifying for the service when a condition is met. The condition can comprise a payment condition, a location condition (e.g., geographic location, location where the first device is purchased and/or deployed), an advertisement condition, a service upgrade condition (e.g., software update), and/or the like.

At step 704, a first key (e.g., first cryptographic key) can be identified. For example, a service provider (e.g., at a second device) can search, query, and/or otherwise access a data store comprising a plurality of keys. One or more of the plurality of keys can be associated with corresponding product class identifiers configured to identify corresponding classes of devices. The service provider can determine that the first key is associated with the first device. For example, the service provider can identify the first key based on an association of the first key with a class of devices to which the first device belongs.

In an aspect, the first key can be related to a second key (e.g., second cryptographic key) stored on the first device. For example, the first key can be a copy of the second key. The first key can be cryptographically related to the second key (e.g., public key corresponding to a private key or vice versa). The second key can be generated based on a product class identifier configured to identify a class of devices comprising the first device. The second key can be generated on the first device, such as on a component of the first device. The second key can be generated at the time of manufacture of the first device, before distribution (e.g., sale) of the first device, after a software update at the first device, and/or the like. The first key and the second key can both have a common sequence of values, such as a hash value of the product class identifier or a value based on the product class identifier. For example, the first key and/or second key can each have a corresponding first portion and corresponding second portion. The second portions of the first key and second keys can match, be similar, be related, be based on the same product class identifier, and/or the like. The first portions of the first key and second key can be dissimilar and/or the first portion can be omitted from the first key. For example, the first portion of the second key can be based on the root key, which can be unique to the first device and/or component.

As a further explanation, the second key can be generated by applying a cryptographic function to the product class identifier. The cryptographic function can comprise a hash function. The second key can also be based on a root key (e.g., another cryptographic key) unique to the first device. The root key can be stored (e.g., permanently) on the first device, such as on the component of the first device. For example, the root key can be stored on the component by the manufacturer of the component (e.g., before the first device is manufactured by the manufacturer of the first device). The cryptographic function can be configured to receive the root key and the product class identifier as inputs. The cryptographic function can input the product class identifier into the hash function. The cryptographic function can combine the result of the hash function (e.g., or the unhashed product class identifier) and the root key together as one to generate the second key. For example, the cryptographic function can append, prepend, and/or the like, the result of the hash function (e.g., or the unhashed product class identifier) to root key. The cryptographic function can encrypt the combined result of the hash function (e.g., or unhashed product class identifier) and the root key.

At step 706, information can be provided (e.g., from the second device) to the first device for the service based on the first key. The information can be encrypted based on the first key. For example, the second key can be configured to decrypt the information encrypted by the first key. In another aspect, the information can be configured to authorize and/or deauthorize usage of the service at the first device. For example, the information can comprise the first key. The first device can be configured to provide the service to a user based on the first key matching the second key.

It should be noted, the method 700 can be applied to a third device that belongs to the class of device. For example, the service can be provided, authorized, deauthorized, and/or otherwise managed for the third device based on the first key. However, the third device can comprise a third key (e.g., third cryptographic key). The third key can be unique to the third device but also be based on the same product class identifier. For example, the third key can be based on a second root key unique to the third device and the product class identifier as described herein. The information of step 706 can be provided (e.g., from the second device) to both the first device and the third device to manage, enable, disable, and/or otherwise implement the service.

It should be noted that the method 700 can be applied to additional classes of devices based on additional product class identifiers and corresponding cryptographic keys associated with the additional classes of devices. For example, a second service can be provided to a second class of devices. The second service can be implemented by providing information based on a fourth key (e.g., fourth cryptographic key). The second class of devices can comprise a second product class identifier. The second class of devices can each have a corresponding (e.g., unique to each device) fifth key (e.g., fifth cryptographic key) based on the second product class identifier. The fifth keys can be configured to match the fourth key, decrypt information encrypted using the fourth key, and/or the like.

Figure 8:
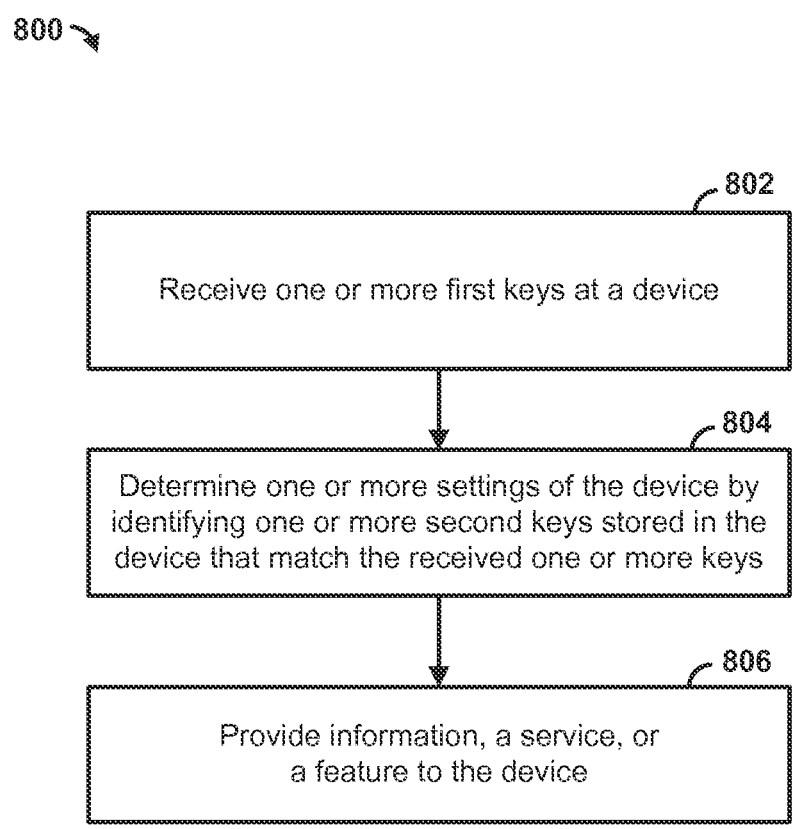
FIG. 8 is a flowchart illustrating yet another example method.

FIG. 8 is a flowchart illustrating an example method 800. At step 802, one or more first keys can be received at a device. The one or more first keys can be associated with one or more settings of the device. For example, the one or more first keys can be identified according to the settings of the device (e.g., device 101) via accessing the key server 115. The one or more first keys can be transmitted to the device (e.g., device 101). In an aspect, the one or more first keys can be associated with a hardware feature (e.g., camera) of the device 101. In another aspect, the one or more first keys can be associated with the state (e.g., enabled or disabled) of a function of the device 101. In an aspect, the one or more first keys can be used to associate a service (e.g., HD service) and/or class of services with the device 101.

At step 804, one or more settings (e.g., hardware configuration, software setting, status of a service) of the device (e.g., or features, components thereof) can be determined. For example, one or more second keys stored in the device that match (e.g., identical, partially identical, cryptographically related, mathematically related) the one or more first keys can be identified. The one or more second keys can be based on a product class identifier configured to identify a class of devices, and/or a feature (e.g., service, hardware component) of the class of devices. The class of devices can include the device. In an aspect, the one or more second keys can be generated based on a cryptographic function as described herein. The one or more second keys can be related to (e.g., mathematically related to, cryptographically related to, copies of) the one or more first keys received by the device.

At step 806, information, a service, and/or a feature can be provided (e.g., transmitted, enabled) to the device. For example, the information can comprise video, audio, text, images, and/or the like. The information can be provided based on the one or more settings of the device. For example, the information, the service, and/or the feature can be provided if authorized based on the settings. As another example, the information, service, and/or feature can be provided (e.g., encrypted, transmitted, enabled) based on the one or more second keys.

In an aspect, step 806 can comprise performing one or more of activation and deactivation of the device according to the determined one or more settings. In an aspect, performing one or more of activation and deactivation of the device can comprise activating a hardware feature of the device, activating a function of the device, activating a service and/or class of services for the device, deactivating a hardware feature of the device, deactivating a function of the device, and deactivating a service and/or class of services for the device. For example, the device 101 can be configured to compare the one or more first keys to the one or more second keys. If the one or more first keys match the one or more second keys, then the device can determine to activate and/or deactivate the hardware feature, services, class of services. Activation and/or deactivation of a hardware feature, service, class of services, and/or the like can comprise modifying a hardware component (e.g., opening or closing a gate (e.g., transistor), reconfiguring circuit elements in an FGPA), opening or closing a switch, enabling or disabling a software module, changing a configuration setting, bypassing a software module or circuit element, allowing or preventing access to a portion of the device (e.g., hardware component or software module), powering on a portion of a circuit (e.g., integrated chip, component), and/or the like of the device. For example, a camera installed in the device 101 can be activated and/or deactivated. As another example, a chip capable of receiving HD service installed on the device 101 can be activated and/or deactivated.

FIG. 9 is a block diagram illustrating an exemplary operating environment for performing the disclosed methods. In an exemplary aspect, the methods and systems of the present disclosure can be implemented on computer 901 as illustrated in FIG. 9 and described below. By way of example, device 101 in FIG. 1, FIG. 2, and FIG. 3 can be computers 901 as illustrated in FIG. 9. As another example, the key server 115, policy server 114, billing system 113, and/or computing device 112 of FIG. 4 can be one or more computers 901 as illustrated in FIG. 9. As a further example, one or more of the systems and/or devices of FIG. 5 can be one or more computers 901 as illustrated in FIG. 9. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the one or more processors 903 to the system memory 912. In an aspect, the system can utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 913, and all buses specified in this description can also be implemented over a wired or wireless network connection and each of the subsystems, including the one or more processors 903, a mass storage device 904, an operating system 905, key creation software 906, key creation data 907, a network adapter 908, system memory 912, an Input/Output Interface 910, a display adapter 909, a display device 911, and a human machine interface 902, can be contained within one or more remote computing devices 914$a,b,c$ at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data, such as key creation data 907, and/or program modules, such as operating system 905 and key creation software 906, that are immediately accessible to and/or are presently operated on by the one or more processors 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and key creation software 906. Each of the operating system 905 and key creation software 906 (or some combination thereof) can comprise elements of the programming and the key creation software 906. Key creation data 907 can also be stored on the mass storage device 904. Key creation data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the one or more processors 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components, such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display device 911 and computer 901 can be part of one device, or separate devices.

The computer 901 can operate in a networked environment using logical connections to one or more remote computing devices 914a,b,c. By way of example, a remote computing device can be a personal computer, portable computer, smartphone, a server, a router, a network computer, a peer device or other common network node, and so on. Logical connections between the computer 901 and the one or more remote computing devices 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 905 are illustrated herein as discrete blocks, although it is recognized that such programs and components reside at various times in different storage components of the computer 901, and are executed by the data processor(s) of the computer. An implementation of key creation software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow: plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining a product class identifier and a root key, wherein the product class identifier and the root key are both stored on a device, and wherein the product class identifier identifies a class of devices comprising a plurality of devices including the device;
   generating a first new key by applying a first key creation function to a first portion of the product class identifier and the root key;
   providing, based on the first new key, a first service;
   generating a second new key by applying a second key creation function to a second portion of the product class identifier and the root key; and
   providing, based on the second new key, a second service.

2. The method of claim 1, wherein the first key creation function comprises a cryptographic function.

3. The method of claim 2, wherein the cryptographic function comprises a hash function.

4. The method of claim 1, wherein the first key creation function comprises a non-reversible key creation function, a non-reusable key creation function, or a combination thereof.

5. The method of claim 1, wherein the first new key comprises a first portion of the first new key based on the product class identifier and a second portion of the first new key not based on the product class identifier.

6. The method of claim 5, wherein the first portion of the first new key is appended to the second portion of the first new key, and wherein the first portion of the first new key is a hash value based on the first portion of the product class identifier.

7. The method of claim 1, wherein the first new key is associated with one or more of a hardware feature of the device, a function of the device, or a combination thereof.

8. The method of claim 1, wherein the root key is stored on a component of the device by a first manufacturer of the component, and wherein the product class identifier is stored on the component by a second manufacturer of the device.

9. The method of claim 8, wherein the component comprises a system on chip, an application specific integrated circuit, a field programmable gate array, or a combination thereof.

10. The method of claim 1, further comprising storing the first new key in an encrypted storage, a permanent storage, or a combination thereof.

11. The method of claim 1, wherein providing, based on the first new key, the first service comprises at least one of:
    authorizing access, based on the first new key, to the first service;
    decrypting, based on the first new key, information for the first service; or encrypting, based on the first new key, information for the first service.

12. The method of claim 1, wherein the first new key is associated with a first state of the device, and the second new key is associated with a second state of the device.

13. The method of claim 1, wherein the product class identifier is associated with one or more of the device, a product, a class of product, a product model, a manufacturer, a service offered by the device, a product line, or a sales location.

14. The method of claim 1, wherein the first service comprises a first video service, and wherein the second service comprises a second video service.

15. A non-transitory computer readable medium storing processor-executable instructions that, when executed by a computing device, cause the computing device to:
 determine a product class identifier and a root key, wherein the product class identifier and the root key are both stored on a device, and wherein the product class identifier identifies a class of devices comprising a plurality of devices including the device;
 generate a first new key by applying a first key creation function to a first portion of the product class identifier and the root key;
 provide, based on the first new key, a first service;
 generate a second new key by applying a second key creation function to a second portion of the product class identifier and the root key; and
 provide, based on the second new key, a second service.

16. The non-transitory computer readable medium of claim 15, wherein the first key creation function comprises a cryptographic function.

17. The non-transitory computer readable medium of claim 16, wherein the cryptographic function comprises a hash function.

18. The non-transitory computer readable medium of claim 15, wherein the first key creation function, a non-reusable key creation function, or a combination thereof.

19. The non-transitory computer readable medium of claim 15, wherein the first new key comprises a first portion of the first new key based on the product class identifier and a second portion of the first new key not based on the product class identifier.

20. The non-transitory computer readable medium of claim 19, wherein the first portion of the first new key is appended to the second portion of the first new key, and wherein the first portion of the first new key is a hash value based on the first portion of the product class identifier.

21. The non-transitory computer readable medium of claim 15, wherein the product class identifier is associated with one or more of the device, a product, a class of product, a product model, a manufacturer, a service offered by the device, a product line, or a sales location.

22. The non-transitory computer readable medium of claim 15, wherein the first service comprises a first video service, and wherein the second service comprises a second video service.

23. An apparatus, comprising:
 one or more processors; and
 a memory storing processor executable instructions that, when executed by the one or more processors, cause the apparatus to:
  determine a product class identifier and a root key, wherein the product class identifier and the root key are both stored on a device, and wherein the product class identifier identifies a class of devices comprising a plurality of devices including the device;
  generate a first new key by applying a first key creation function to a first portion of the product class identifier and the root key;
  provide, based on the first new key, a first service;
  generate a second new key by applying a second key creation function to a second portion of the product class identifier and the root key; and
  provide, based on the second new key, a second service.

24. The apparatus of claim 23, wherein the key creation function comprises a cryptographic function.

25. The apparatus of claim 23, wherein the product class identifier is associated with one or more of the device, a product, a class of product, a product model, a manufacturer, a service offered by the device, a product line, or a sales location.

26. The apparatus of claim 23, wherein the first service comprises a first video service, and wherein the second service comprises a second video service.

* * * * *